United States Patent
DeAngelis et al.

(10) Patent No.: US 8,978,420 B2
(45) Date of Patent: Mar. 17, 2015

(54) BENDING DEVICE FOR SHAPING GLASS FOR USE IN AIRCRAFT TRANSPARENCIES

(71) Applicant: PPG Industries Ohio, Inc., Cleveland, OH (US)

(72) Inventors: John E. DeAngelis, Allison Park, PA (US); Yu Jiao, Blawnox, PA (US); Dennis D. Warren, Fayetteville, TN (US); Chao Yu, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 208 days.

(21) Appl. No.: 13/714,494

(22) Filed: Dec. 14, 2012

(65) Prior Publication Data

US 2014/0165653 A1 Jun. 19, 2014

(51) Int. Cl.
  *C03B 23/025* (2006.01)
  *C03B 23/00* (2006.01)
  *C03B 23/027* (2006.01)
  *C03B 40/00* (2006.01)

(52) U.S. Cl.
  CPC .......... *C03B 23/0066* (2013.01); *C03B 23/027* (2013.01); *C03B 40/005* (2013.01); *C03B 2225/02* (2013.01)
  USPC .................... 65/291; 65/290; 65/106; 65/107

(58) Field of Classification Search
  CPC .......................... C03B 23/027; C03B 23/0026
  See application file for complete search history.

(56) References Cited

U.S. PATENT DOCUMENTS

| | | | | |
|---|---|---|---|---|
| 3,155,485 A | * | 11/1964 | Ritenour et al. | 65/291 |
| 3,220,821 A | * | 11/1965 | Golightly | 65/291 |
| 3,278,289 A | | 10/1966 | Humes | |
| 4,119,428 A | * | 10/1978 | DeAngelis et al. | 65/287 |
| 4,184,864 A | | 1/1980 | Reese | |
| 4,597,789 A | * | 7/1986 | Reese | 65/106 |
| 4,666,492 A | | 5/1987 | Thimons et al. | |
| 4,744,809 A | | 5/1988 | Pecoraro et al. | |
| 4,820,902 A | | 4/1989 | Gillery | |
| 5,028,759 A | | 7/1991 | Finley | |
| 5,653,903 A | | 8/1997 | Pinchok, Jr. et al. | |
| 5,759,220 A | | 6/1998 | Boaz | |
| 6,006,549 A | * | 12/1999 | Savka et al. | 65/290 |
| 6,094,942 A | | 8/2000 | Falleroni et al. | |
| 6,301,858 B1 | | 10/2001 | Crandell | |
| 6,629,436 B1 | * | 10/2003 | Skeen et al. | 65/107 |
| 7,240,519 B2 | | 7/2007 | Schwartz et al. | |
| 7,335,421 B2 | | 2/2008 | Thiel et al. | |
| 7,871,703 B2 | | 1/2011 | Shelestak et al. | |

(Continued)

OTHER PUBLICATIONS

Mechanical Engineering, "Elements of Jigs and Fixtures", Engineeringhut.blogspot.com html, Nov. 25, 2010.*

(Continued)

*Primary Examiner* — Lisa Herring
(74) *Attorney, Agent, or Firm* — Andrew C. Siminerio

(57) ABSTRACT

A sheet bending device includes a sheet shaping rail having a stationary shaping rail portion mounted on a support member and an articulating shaping rail portion pivotally mounted on the support member for movement from a non-shaping position to a shaping position. A retention member limits movement of a sheet to be shaped relative to the stationary shaping rail portion when the articulating shaping rail portion moves to the shaping position. A "cut-to-size" method is also disclosed to shape a sheet for use in making an aircraft transparency.

16 Claims, 10 Drawing Sheets

(56) References Cited

U.S. PATENT DOCUMENTS 8,268,741 B2 9/2012 Heithoff et al.
8,304,358 B2 11/2012 Shelestak et al.
2004/0236447 A1* 11/2004 Matsushita et al. ............. 700/98

OTHER PUBLICATIONS

United, "Locating Pins Brochure", pp. D31-D39, Sep. 1999.*
PCT Search Report, PCT/US2013/073500, dated Mar. 24, 2014.

* cited by examiner

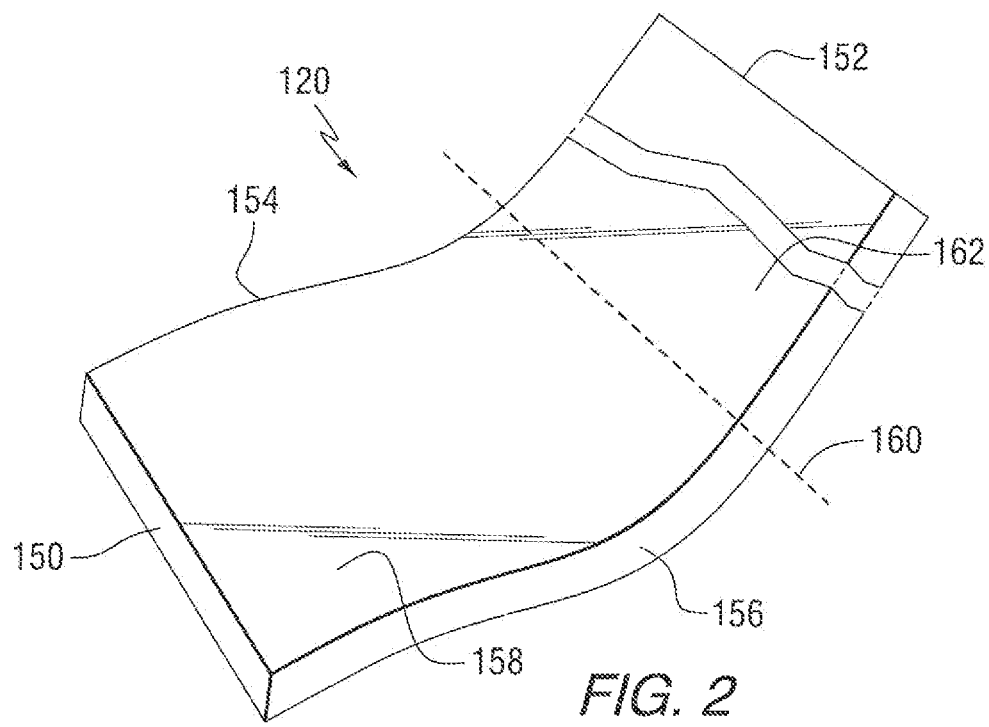
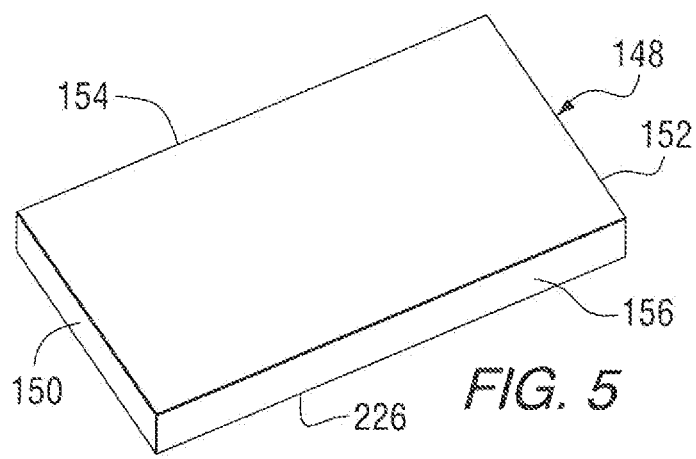
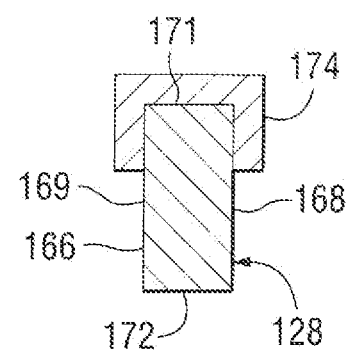
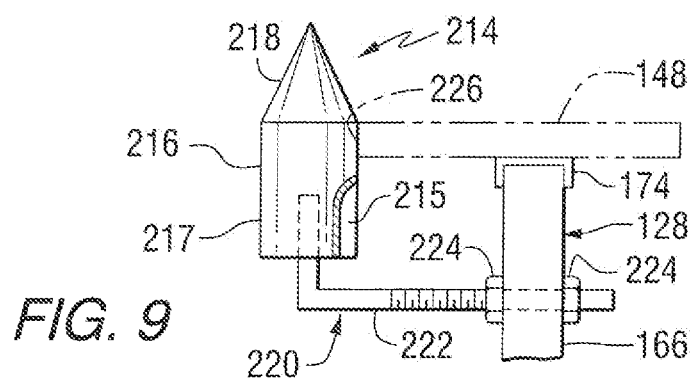

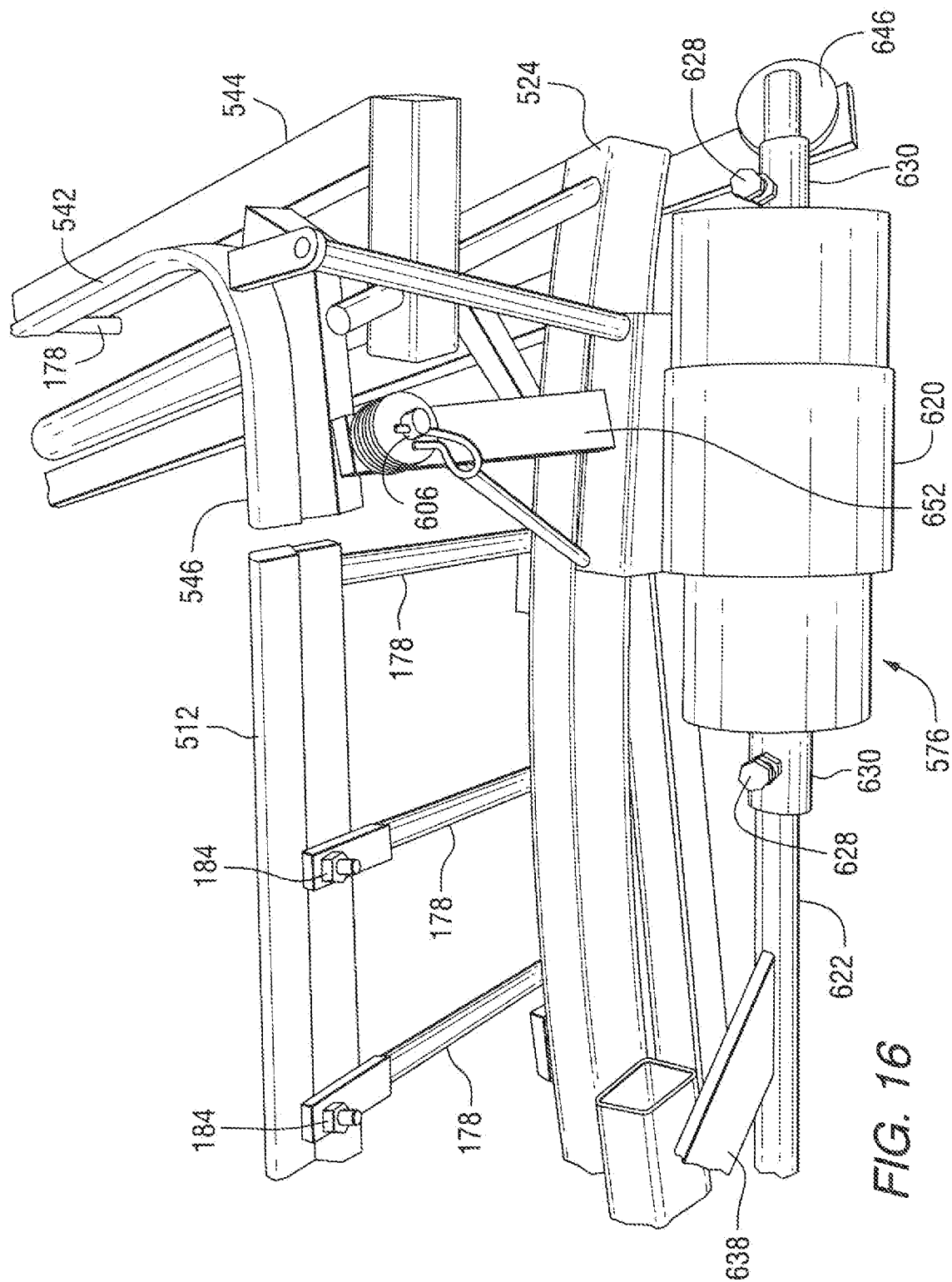

BENDING DEVICE FOR SHAPING GLASS FOR USE IN AIRCRAFT TRANSPARENCIES

BACKGROUND OF THE INVENTION

1. Field of the Invention

This invention relates to a bending device, usually referred to in the glass bending art as a bending iron, for shaping glass for use in aircraft transparencies, and more particularly relates to a bending iron for symmetric/asymmetric shaping of glass sheets cut to size for use in the manufacture of monolithic and/or laminated aircraft transparencies.

2. Presently Available Bending Device Technology

Bending devices, commonly referred to in the bending art as bending irons, are well known for shaping glass sheets for use in the manufacture of monolithic and laminated transparencies for land, water, air and space vehicles. In general, the processing of glass sheets for use in the manufacture of transparencies for land and water vehicles usually include cutting a glass substrate to provide a glass sheet having a predetermined size; moving a bending iron having the glass sheet through a furnace to heat soften and shape the glass sheet; controllably cooling the shaped glass sheet to anneal or heat strength the shaped glass sheet, and using the shaped glass sheet in the manufacture of a transparency for a land or water vehicle. In general, the processing of glass sheets for use in the manufacture of transparencies for air and space vehicles usually include cutting a glass substrate to provide a glass sheet having a predetermined size; moving a bending iron having the glass sheet through a furnace to heat soften and shape the glass sheet; controllably cooling the shaped glass sheet to anneal the shaped glass sheet; cutting the shaped glass sheet to a second predetermined size; chemically strengthening the shaped glass sheet, and using the shaped glass sheet in the manufacture of a transparency for an air or space vehicle.

The difference between shaping a glass sheet for use with transparencies for land and water vehicles and shaping a glass sheet for use with transparencies for air and space vehicles of interest in the present discussion is that the glass sheet for use with transparencies for land and water vehicles is cut to size before bending, whereas a glass sheet for use with transparencies for air and space vehicles is cut to an over size before bending and cut to size after bending. For purposes of clarity in the discussion of the glass window, the process for shaping a glass sheet for use with transparencies for land and water vehicles is also referred to as "cut-to-size", and the process for shaping a glass sheet for use with transparencies in air and space vehicles is referred to as "cut-after-bend".

The cut-to-size process is acceptable for making transparencies for land and water vehicles because the glass sheets are thinner, and the optical quality requirement for land and water vehicles is lower than the optical quality requirement for aircraft transparencies. More particularly, the thickness range for glass for automotive transparencies is in the range of 1.8 to 3 millimeters ("mm") whereas the thickness range for glass for aircraft transparencies is in the range of 2 to 15 mm. Because the glass sheets used for making transparencies for air and space vehicles are thicker, the bending iron having the glass sheet remains in the furnace for a longer period of time to heat the sheet to its bending temperature, which usually results in marring or marking surface areas of the glass sheet in contact with the bending iron during the long heating periods. The marring or marking of the glass sheet can cause distortions on the surface of the glass sheets, which can make the optical quality of the glass unacceptable. Further, the displacement between the glass surface and the metal surface of the bending iron under the high temperature condition will also cause scratches in the glass surface, which results in unacceptable defects.

As can now be appreciated, the marring and marking of the glass in the vision area is presently reduced or eliminated by providing a bending iron and oversized glass sheet. After glass sheet is shaped, the shaped glass sheet is cut to size. The portions of the glass sheet cut away have the marring and markings from the bending iron.

As can now be appreciated it would be advantages to provide a bending iron to shape glass sheets for air and space vehicles that does not have the limitations of the presently available bending irons, e.g. but not limited to, a bending iron that does not cause surface defects, which causes optical distortions in the vision area of the transparency; a bending iron that can be used to make symmetric and asymmetric shaped glass sheets without having contact area distortions and scratches in the vision area of the transparency, and a bending iron that can be used in a cut-to-size process for shaping glass sheets to make transparencies for air and space vehicles.

SUMMARY OF THE INVENTION

The invention relates to a sheet bending device including, among other things, a support member; a sheet shaping rail comprising a stationary shaping rail portion securely mounted on the support member and an articulating shaping rail portion pivotally mounted on the support member; a force biasing member operative connected to the articulating shaping rail portion to move the articulating shaping rail portion from a non-shaping position to a shaping position, and a retention member to limit movement of a sheet to be shaped relative to the stationary shaping rail portion when the force biasing member moves the articulating shaping rail portion from the non-shaping position to the shaping position.

The invention further relates an improved method of shaping a glass sheet to provide a shaped glass sheet for use in the manufacture of an aircraft windshield. The method that is improved by the invention includes, among other steps, the steps of:

(1) determining the peripheral dimensions of a flat glass sheet defined as desired peripheral dimensions such that when the flat glass sheet having the desired peripheral dimensions is shaped, the shaped glass sheet for use in the manufacture of an aircraft windshield is provided;

(2) providing a flat glass sheet having peripheral dimensions defined as enlarged peripheral dimensions greater than the desired peripheral dimensions;

(3) positioning the flat glass sheet having the enlarged peripheral dimensions on shaping rails of a bending device such that the shaping rail of the bending device engages the sheet having the enlarged peripheral dimensions in an area of the sheet between the desired peripheral dimensions and the enlarged peripheral dimensions;

(4) heating, shaping and cooling the sheet having the enlarged peripheral dimensions;

(5) cutting the shaped glass sheet having the enlarged peripheral dimensions to provide the shaped glass sheet for use in the manufacture of an aircraft windshield, (6) using the shaped sheet from step (5) in the manufacture of the aircraft windshield, wherein the method including steps (1) through (6) is defined as a cut-after-bend method. The improvement includes, among other steps, the steps of:

(a) practicing step (1);

(b) providing a flat glass sheet having the desired peripheral dimensions;

(c) positioning the flat glass sheet having the desired peripheral dimensions on shaping rails of a bending device such that the shaping rail of the bending device engages the sheet having the desired peripheral dimensions in an area of the sheet within the desired peripheral dimensions;

(d) heating, shaping and cooling the sheet having the desired peripheral dimensions;

(e) using the shaped sheet from step (d) in the manufacture of an aircraft windshield, wherein the method including steps (a) through (e) is defined as cut-to-size method,

BRIEF DESCRIPTION OF THE DRAWINGS

FIG. 2 is an isometric view of a shaped glass sheet having portions removed for purposes of clarity; the shaped glass sheet shaped in accordance to the teachings of the invention. The shaped glass sheet can be used in the fabrication of a laminated aircraft transparency of the type shown in FIG. 1.

FIG. 5 is an isometric view of a flat glass sheet that can be shape in accordance to the teachings of the invention to provide a shaped sheet, e.g. a shaped sheet of the type shown in FIG. 2.

FIG. 6 is a cross sectional view of a non-limiting embodiment of a shaping rail of the invention.

FIG. 9 is a side elevated view of a non-limiting embodiment of a sheet retention and alignment member of the invention.

FIG. 16 is an enlarged isometric view of a non-limiting embodiment of a biasing arrangement of the invention that is used in the practice of the invention to apply a biasing force to the articulating rail portion of the bending device shown in FIG. 15.

DETAILED DESCRIPTION OF THE INVENTION

Figure 1:
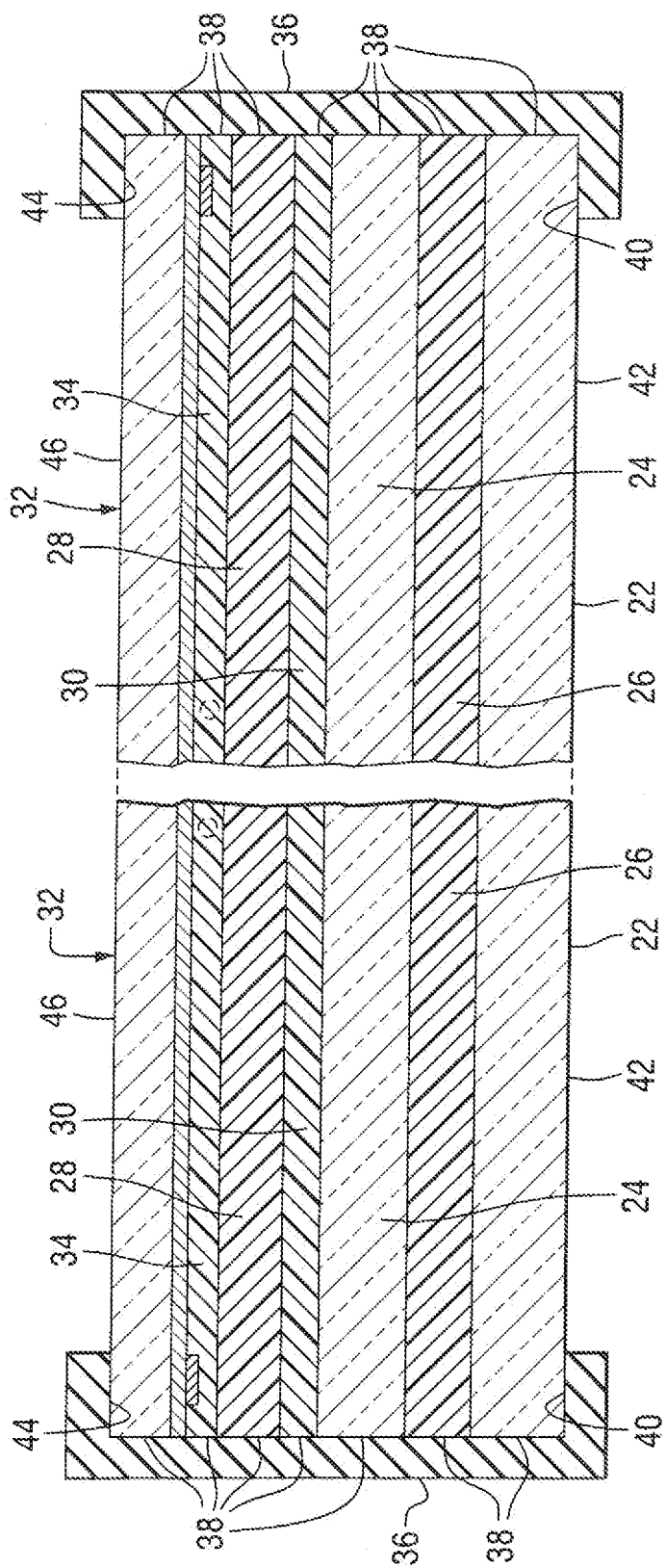
FIG. 1 is a cross sectional view of a laminated aircraft transparency illustrating the laminated structure of an aircraft transparency.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3; 4.7 to 7.5; 5.5 to 10, and the like.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

For purposes of the following discussion, the invention will be discussed with reference to, shaping a sheet for an aircraft transparency. As will be appreciated, the invention is not limited to the material of the sheet, e.g. the sheet can be, but is not limited to, a glass sheet or a plastic sheet. In the broad practice of the invention, the sheet can include any desired material having any desired characteristics. For example, the sheet can be opaque, transparent or translucent to visible light. By "opaque" is meant having visible light transmission of 0%. By "transparent" is meant having visible light transmission in the range of greater than 0% to 100%. By "translucent" is meant allowing electromagnetic energy (e.g. visible light) to pass through but diffusing this energy such that objects on the side opposite the viewer are not clearly visible. In the preferred practice of the invention, the sheet is a transparent glass sheet. The glass sheet can include conventional soda-lime-silicate glass, borosilicate glass, or lithium glass used in chemical tempering. The glass can be clear glass. By "clear glass" is meant non-tinted or non-colored glass. Alternatively, the glass can be tinted or otherwise colored glass. The glass can be annealed, heat-treated or chemically tempered. In the practice of the invention, the glass can be conventional float glass, and can be of any composition having any optical properties, e.g., any value of visible transmission, ultraviolet transmission, infrared transmission, and/or total solar energy transmission. By "float glass" is meant glass formed by a conventional float process. Examples of float glass processes are disclosed in U.S. Pat. Nos. 4,744,809 and 6,094,942.

In the preferred practice of the invention, the glass is a clear transparent glass of the type that can be chemically strengthened. Chemical strengthening or chemical tempering of glass involves an exchange of ions near the surface of the glass, e.g.

a glass article with ions from an external source, typically a molten inorganic salt bath, to generate a zone near the surface of the glass which is in a state of compression relative to the interior portions of the glass. A detailed discussion of chemical tempering is present in U.S. Pat. No. 7,871,703, which patent is hereby incorporated by reference, and no further discuss regarding chemical tempering is deemed necessary. As will be appreciated, the invention is not limited to a clear transparent glass that can be chemically tempered, and clear transparent glasses that can be thermally tempered, e.g. soda-lime-silicate glasses of the types disclosed in U.S. Pat. Nos. 8,268,741, and 8,304,358 can be used in the practice of the invention and are hereby incorporated by reference.

In the preferred practice of the invention, the glass sheet is used in the manufacture of monolithic or laminated transparencies for an aircraft. However as can be appreciated, the shaped glass sheet can be used in the manufacture of any type of transparency, such as but not limited to windshields, windows, rear lights, sunroofs and moonroofs; laminated or non-laminated residential and/or commercial windows; insulating glass units, and/or transparencies for land, air, space, above water and under water vehicles. Non-limiting examples of vehicle transparencies, residential and commercial transparencies, and aircraft transparencies and methods of making the same are found in U.S. Pat. Nos. 4,820,902; 5,028,759, 5,653,903; 6,301,858; and 7,335,421, which patents are hereby incorporated by reference.

Shown in FIG. 1 is a non-limiting embodiment of an aircraft windshield 20 that has components that can be made by the practice of the invention. The windshield 20 includes a first glass sheet 22 secured to a second glass sheet 24 by a first interlayer or sheet 26; the second sheet 24 secured to a vinyl-interlayer or sheet 28 by a first urethane interlayer 30, and the second vinyl-interlayer 28 secured to a heatable member 32 by a second urethane interlayer 34. An edge member or moisture barrier 36 of the type used in the art, e.g. but not limited to a silicone rubber or other flexible durable moisture resistant material is secured to (1) peripheral edge 38 of the windshield 20, i.e. the peripheral edge 38 of the first and second sheets 22, 24; of the first and second vinyl-interlayers 26, 28; of the first and second urethane interlayers 30, 34 and of the heatable member 32; (2) margins or marginal edges 40 of outer surface 42 of the windshield 20, i.e. the margins 40 of the outer surface 42 of the first glass sheet 22 of the windshield 20, and (3) margins or marginal edges 44 of outer surface 46 of the windshield 20, i.e. margins of the outer surface 46 of the heatable member 32.

As is appreciated by those skilled in the art and not limiting to the invention, the first and second glass sheets 22, 24; the first and second vinyl-interlayers 26, 28 and the first urethane interlayer 30 form the structural part, or inner segment, of the windshield 20 and the outer surface 42 of the windshield 20 faces the interior of the vehicle, e.g. an aircraft (not shown), and the second urethane layer 34 and the heatable member 32 form the non-structural part, or outer segment, of the windshield 20, and the surface 46 of the windshield 20 faces the exterior of the aircraft. As is appreciated by those ski/led in the art, the heatable member 32 provides heat to remove fog from, and/or to melt ice on, the outer surface 46 of the windshield 20.

As can be appreciated the invention is not limited to the construction of the windshield 20 and any of the constructions of aircraft transparencies used in the art can be used in the practice of the invention. For example and not limited to the invention, the windshield 20 can include a construction wherein the vinyl interlayer 28 and the urethane interlayer 30 are omitted, and/or the sheets 22 and 24 are plastic sheets.

Further, the cross section of the window 20 shown in FIG. 1 shows flat or non-shaped sheets, the invention is not limited thereto and the window 20 can have a contour to match the contour of the outer surface of the aircraft in which the window is mounted.

Generally the glass sheets 22, 24 of the windshield 20 are clear chemically strengthened glass sheets; however, the invention is not limited thereto, and the glass sheets can be heat strengthened or heat tempered glass sheets. Further as is appreciated, the invention is not limited to the number of glass sheets, vinyl interlayers or urethane interlayers that make up the windshield 20, and the windshield 20 can have any number of sheets and/or interlayers.

Figure 3:
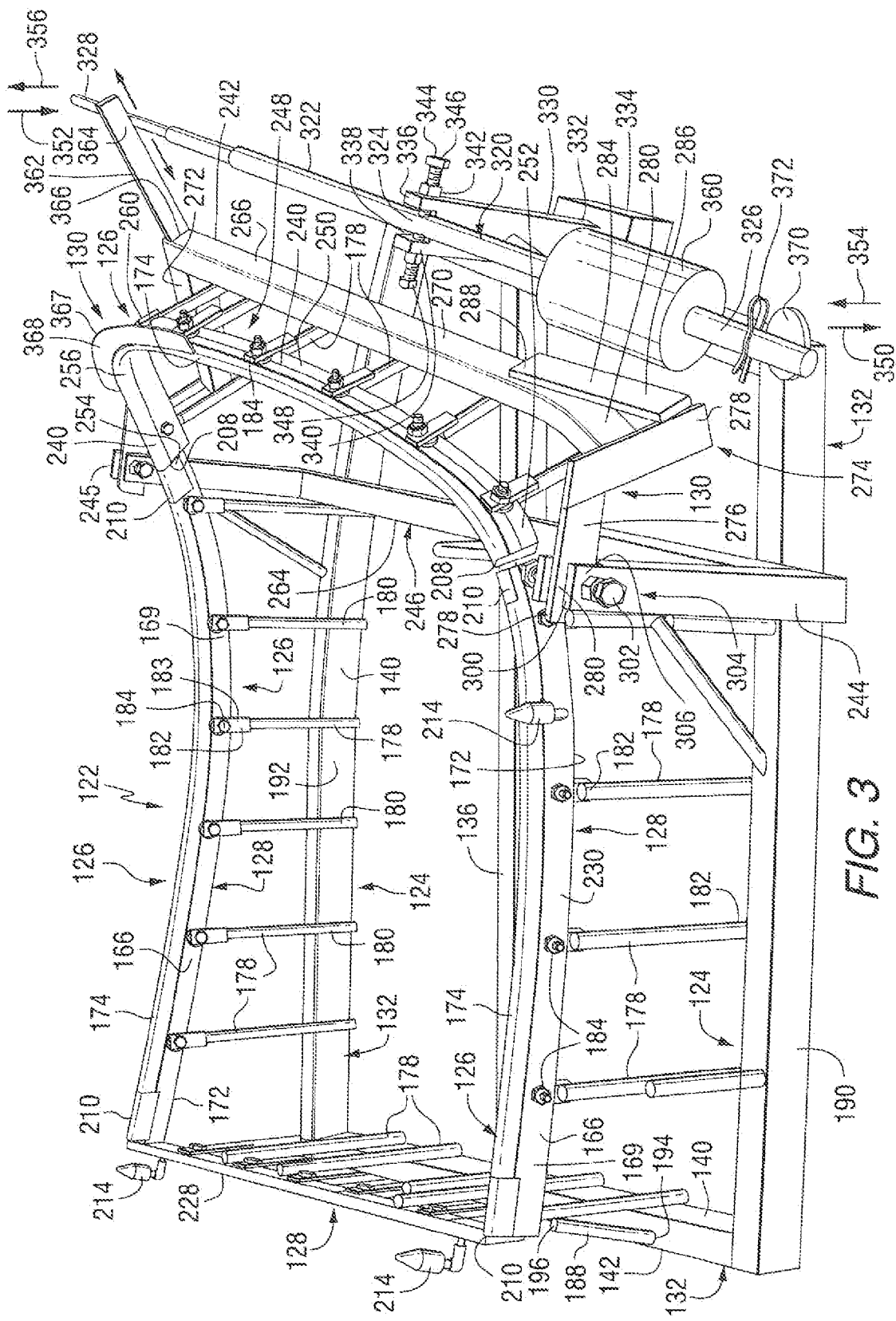
FIG. 3 is an isometric view of a non-limiting embodiment of a bending device of the invention that can be used in the practice of the invention to shape glass sheets, e.g. a shaped sheet of the type shown in FIG. 2.
Figure 4:
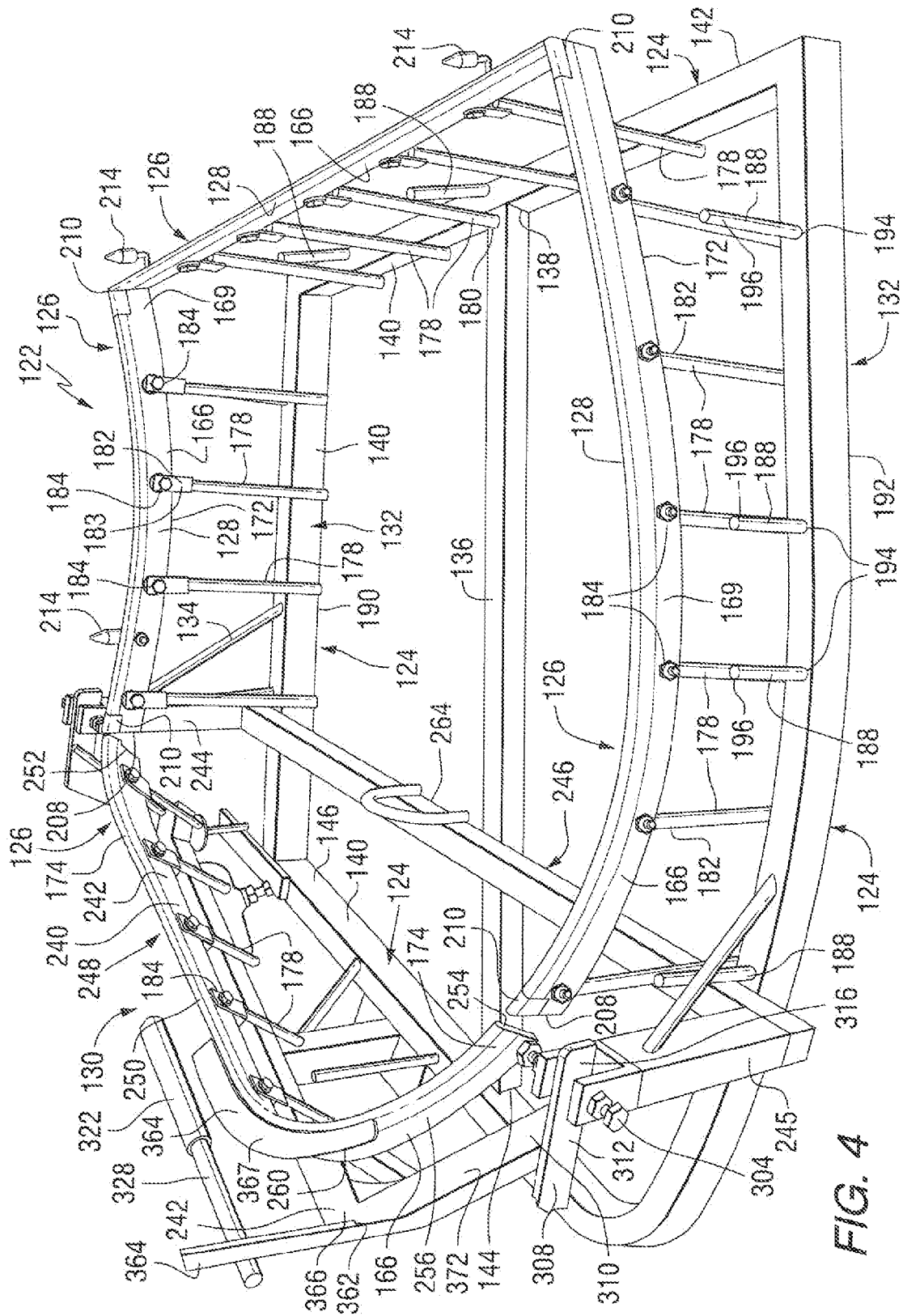
FIG. 4 is an isometric view of an opposite side of the bending device shown in FIG. 3.
Figure 7:
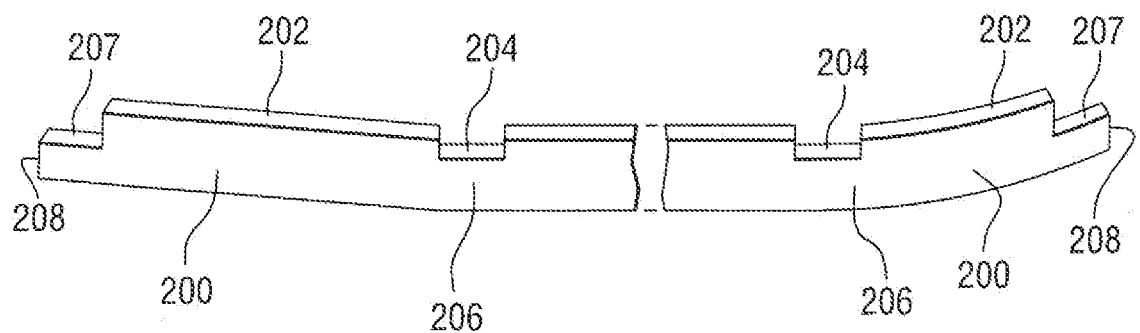
FIG. 7 is an isometric view of a non-limiting embodiment of a shaping rail that can be used in the practice of the invention.

With reference to FIG. 2 there is shown a shaped glass sheet 120 shaped with a non-limited embodiment of a bending device or bending iron 122 (see FIGS. 3 and 4) of the invention in accordance to the teachings of the invention. With reference to FIGS. 3 and 4 as needed, the bending device or bending iron 122 includes a ridged main support member 124 to support a shaping rail 126 having a stationary shaping rail portion or stationary rail portion 128 and an articulating shaping rail portion or articulating rail portion 130. The shaping rail 126 is discussed in detail below. The main support member 124 includes a frame 132 preferably made of a ridged material, e.g. but not limited to 1 inch square hollow steel tubing having a wall thickness of ⅛ inch. The tubing forms an outer boundary of the frame 132. A cross beam 136 made of the hollow steel tubing has one end 138 joined to an inside surface 140 of a side 142 of the frame 132 (see FIG. 4). Opposite end 144 of the cross beam 136 is joined to the inner surface 140 of opposite side 146 of the frame 132. The surface 140 faces the interior of the frame 132. The tubing of the frame 132 and cross beam 136 of the support member 124 are joined together in any convenient manner, e.g. by screws, adhesive or welding, to provide the frame 132 with a predetermined configuration and size compatible with the configuration of the shaping rail 126 as discussed below. In the preferred practice of the invention, the tubing of the frame 132 and cross beam 136 of the support member 124 are welded together in any usual manner.

The discussion is now directed to the features of the shaping rail 126 of the invention to shape a flat glass sheet 148 (see FIG. 5) to the shaped glass sheet 120 (see FIG. 2). As will be appreciated, the invention is not limited to the embodiment of the shaping rail 126 of the invention shown in FIGS. 3 and 4 to provide the shaped sheet 120 shown in FIG. 2, and the non-limited embodiment of the shaping rail 126 shown in FIGS. 3 and 4 can be modified within the teachings of the invention to shape the flat sheet 148 (see FIG. 5) to a shaped sheet having a different contour from the contour of the shaped sheet 120 shown in FIG. 2.

With reference to FIG. 2, in one non-limiting embodiment of the invention, the shaped glass sheet 120 is used as one sheet of two sheets of a laminated aircraft windshield. In general, the shaped sheet 120 has a first end 160, an opposite second end 152, a first side 154 and an opposite second side 156 with the ends 150 and 152, and the sides 154 and 156 of the sheet 120 defining the perimeter of the shaped sheet 120 and the flat sheet 148 (see FIG. 5). The sheet 120 has a first portion 158 extending from the end 150 to an imaginary line identified by the number 160, and a second portion 162 extending from the imaginary line 160 to the second end 152 of the sheet 120. The first portion 158 of the sheet, e.g. the sheet 148 shown in FIG. 5 is shaped on the stationary portion 128 of the shaping rail 126 and the second shaped portion 162 of the sheet 120 is shaped on the articulating rail portion 130 of the shaping rail 126 (see FIGS. 3 and 4).

With reference to FIGS. 3, 4 and 6 as needed, in one non-limiting embodiment of the invention, the stationary portion 128 of the shaping rail 126 on which the sheet 120 or 148 rests is a stainless steel bar 166 having a thickness of ⅛ inch as measured between sides 168 and 169 of the bar 166, and a length or height as measured between the ends 171 and 172 of 2 inches. The end 171 of the steel bar 166 supporting the glass sheet 120 or 148 is cover with a metal weaved cloth 174 secured to the sides 168 and 169 of the bar 166 in any convenient matter, e.g. by tack welding, in one non-limiting embodiment of the invention, the metal weaved cloth 174 is a stainless steel weaved cloth of the type sold by Bekeart number NP400.

The stationary rail portion 128 of the shaping rail 126 is maintained in a fixed relationship to the main support member 124 by a plurality of rigid support member 178 of the type used in the art, e.g. of the type disclosed in U.S. Pat. No. 6,629,436, which patent is hereby incorporated by reference. In general and not limiting to the invention, the support members 178 have an end 180 secured to the support member 124, and an opposite end 182 secured, in any convenient manner to the stationary rail portion 128 of the shaping rail 126. In the preferred practice of the invention, the end 180 of the support members 178 is welded to the inner surface 140 of the support member 124, and the opposite end 182 of the support members 178 have a flattened end 183 with a hole (not shown). The hole of the post is aligned with a hole (not shown) in the stationary rail portion 128 of the shaping rail 126 to receive a nut and bolt assembly 184 to secure the stationary rail portion 128 of shaping rail 126 to the end 182 of the support members 178 to maintain the stationary rail portion 128 of the shaping rail 126 in a fixed space relationship to the main support member 124.

With reference to FIGS. 3 and 4, selected ones of the support members 178 securing the stationary rail portion 128 of the shaping rail 126 to the support member 124 have a re-enforcement rod 188 to provide stability to the stationary rail portion of the shaping rail 126 during the heating and shaping of the glass sheet 120 or 148 supported on the shaping rail 126 of the support member 124. The invention is not limited to the number of re-enforcement rods 188 used, and the number depends on, among other things, the expected temperature of the furnace, the time the bending iron is in the furnace, the thickness of the support members 178 and the heat absorption of the support members. In one non-limiting embodiment of the invention, the bending iron was used to shape a lithium containing glass for an aircraft windshield. As is appreciated by those skilled in the art lithium containing glass has a shaping temperature of 1040° F., and soda-lime-silicate glass has a shaping temperature of 1090° F.

The support members 178 were made of stainless steel had a diameter of ⅜ inch and a height of 9 inches. As can now be appreciated by those skilled in the art, the lengths of the supports are dictated by the final shape of the glass and vary depending on the curvature of the final product. The bending iron 122 had stainless steel re-enforcement rods 188 having a diameter of ⅜ inch and a height to provide support for the support members 178. The side 142 of the main support member 124 had 5 rigid support members 178; side 190 between the sides 142 and 146 of the main support member 124 had four rigid supports 178; and side 192 (shown as front side in FIG. 4) opposite to the side 190 had six rigid support members 188. The side 146 of the main support member 124 is discussed with the discussion regarding the articulating rail portion 130 of the shaping rail 126. The rigid supports 180 of the side 190 had no re-enforcement rods 188 (see FIG. 3). The first and third rigid support members 178 counting from the corner of the sides 142 and 190 of the main support member 124 each had a re-enforcement rod. The side 192 of the main support member 124 had six rigid support members. The two outer and the two center support members 178 had a re-enforcement rod 188.

As is appreciated, the invention is not limited to the manner in which the re-enforcement rods 188 are secured to their respective rigid support member 178. In the non-limiting embodiment of the invention under discussion, end 194 of the rigid support members 188 were welded to the main support member 124 and opposite end 196 was welded to its respective support member 178.

Figure 8:
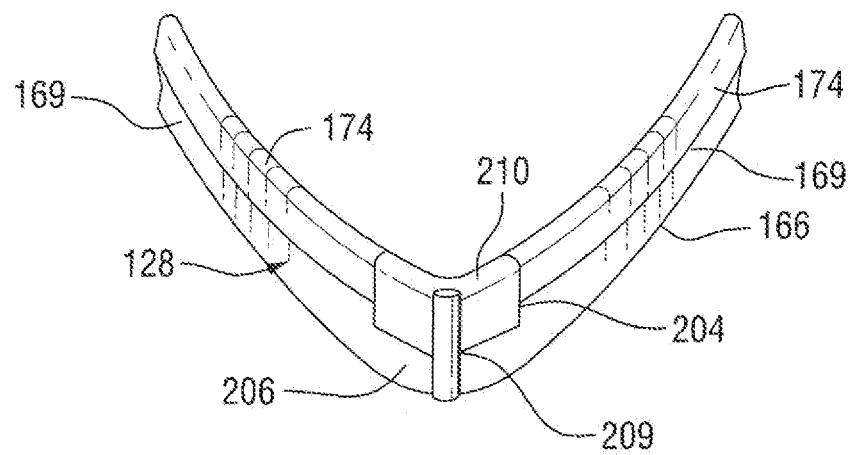
FIG. 8 is a perspective view of a non-limiting embodiment of a corner of a shaping rail of the invention.

With reference to FIGS. 3, 4, 7 and 8 as needed, in a non-limiting embodiment of the invention, the stationary portion 128 of the shaping rail 126 was made by cutting a flat strip 200 having contours 202 to provide the stationary portion 128 of the shaping rail 126, and notches 204 at corners, or expected corners 206 (see FIG. 8), of the stationary portion 128 of the shaping rail 126, and notches 207 at each end 208 of the stationary portion of the shaping rail. The strip 200 is bent to the shape of the stationary rail portion 128 of the shaping rail 126 in any convenient manner. With reference to FIG. 8, a post 209 is welded to the surface 169 of the bar 166, and a tungsten carbide block 210 is secured in position by the post 209. The notches 204 eliminate the metal bunching at the corners 206 when the strip 200 is bent. The tungsten carbide blocks 210 are secured in the notches at the ends 208 of the bar 166 in any convenient manner. The tungsten carbide blocks 210 at the corners and the ends 208 provide a non-friction surface to support the glass sheet 120 or 148 at the corners 206 and the ends of the stationary portion 128 of the shaping rail 126. The height of the tungsten carbide blocks is preferable equal to or slightly higher than the height of the bar 166 having the metal weave cloth.

With reference to FIGS. 3, 4 and 9 as needed, secured on, and spaced from, the bar 166 of the stationary rail portion 128 of the shaping rail 126 are sheet retention and alignment members 214. In the preferred practice of the invention, the retention members 214 had a stainless steel core 215 and a carbon sheath 217; however, as can be appreciated, the retention members 214 can be one piece made of any material capable of withstanding sanding high temperatures, e.g. made of metal and non metallic material, e.g. plastic, tungsten carbide and carbon. The retention and alignment members 214 had a configuration having a cylindrical bottom portion 216 and a cone shaped top portion 218. The retention members 214 were connected to the bar 166 of the stationary portion 128 of the shaping rail 126 in any convenient manner, e.g. in the practice of the invention an L-shaped threaded member 220 having long leg 222 of the L-shaped member 220 secured to the bar 166 of the stationary portion 128 of the shaping rail 126 by a pair of bolts 224 threaded on the long leg 222 of the L-shaped member 220 with the stationary portion 128 of the shaping rail 126 between the bolts 224 (see FIG. 9). With continued reference to FIG. 9, the cylindrical portion 216 of the retention member 214 extends above the stationary rail portion 128 of the shaping rail 126. With this arrangement, when the flat glass sheet 148 to be shaped is placed on the shaping rail 126, peripheral edge 226 of the glass sheet 120 can slide down the surface of the cone shaped portion 218 of the alignment member 214, and thereafter along the outer surface of the cylindrical portion 216 to align the sheet 148 with the stationary rail portion 128 of the shaping rail 126 and to prevent the sheet 148 from sliding along the shaping rail 126 away from the articulating rail portion 130 of the shaping rail 126 during the sheet shaping process.

In a non-limiting embodiment of the invention, two retention and alignment members 214 were secured in spaced relationship to one another and 2 inches from the adjacent corner 206 on a segment 228 of the stationary portion 128 of the shaping rail 126 opposite to the articulating rail portion 130 of the shaping rail 126 (see FIGS. 3 and 4), and one retention and alignment member 214 was secured on a segment 230 of the stationary rail portion 128 of the shaping rail 126 adjacent to and spaced 4 inches from the articulating rail portion 130 of the shaping rail 126, and one of the retention and alignment members 214 was secured to a segment 230 of the stationary rail portion 128 of the shaping rail 126 adjacent to and spaced 4 inches from the articulating rail portion 130 of the shaping rail 126. The retention members 214 align the sheet 148 on the shaping rail. The alignment and retention members 214 on the segment 228 also limit movement of the sheet 148 away from the articulating rail portion 130 of the shaping rail 126 as the sheet 148 is shaped by the articulating rail portion 130. The alignment and retention member 214 on the segment 230 of the stationary rail portion 128 of the shaping rail 126 also limits movement of the sheet 148 over the segment 230 of the stationary rail portion 128 of the shaping rail 126 as the articulating rail portion 130 of the shaping rail 126 moves to shape the sheet 148 in a manner discussed below.

As can now be appreciated, the invention is not limited to the number of alignment members 214 secured on the stationary rail portion 128 of the shaping rail 126 and any number, e.g. 5, 7 or more can be used; further, the invention is not limited to the placement of the retention and alignment members 214 on the shaping rail 126, and the retention member can be placed at any location of the shaping rail 126 where it can be expected that the sheet 120 can move when the articulating rail portion 130 of the shaping rail 126 moves to shape the sheet 148.

The discussion is now directed to the articulating rail portion 130 of the shaping rail 126. With reference to FIGS. 3, 4, 10 and 11 as needed, the articulating rail portion 130 includes a shaping rail section 240 mounted on a support frame or cradle 242 by the rigid support member 178 in a similar manner as the bar 166 of the stationary portion 128 of the shaping rail 126 is mounted on the main support member 124 of the bending iron 122. The support frame 242 is pivotally mounted as discussed below to upright members 244 and 245 of a U shaped frame 246 securely mounted on the main support member 124 and cross beam 136 of the bending iron 122. The shaping rail section 240 is made of stainless steel bar 248 and shaped to have a generally L-shaped configuration (hereinafter also referred to as "L-shaped bar 248"). End 252 of the long leg 250 of the L-shape bar 248 is aligned with the adjacent end 208 of the stationary portion 128 of the shaping rail 126 (see FIG. 3), and end 254 of the short leg 256 of the L-shaped bar 252 is aligned with adjacent end 208 of the stationary portion 128 of the shaping rail 126 (see FIG. 4) such that the shaping rail 126 forms a closed shaping rail 126.

The L-shaped bar 248 in cross section has the same configuration and dimensions as the bar 166 of the stationary portion 128 of the shaping rail 126 (see FIG. 6). The metal weaved cloth 174 covers upper portion of the L-shaped bar 248 and is tack welded to the bar 248 in a similar fashion as the metal weaved cloth 174 is secured on the bar 166 of the stationary portion 128 of the shaping rail 126. The L-shaped bar 248 is formed in a similar fashion as the bar 166 of the stationary portion 128 of the shaping rail 126 except that there is no notch at junction 260 of the long leg 250 and short leg 257 of the L-shaped bar 248 because the junction 260 has a radius greater than the radius of the bends of the stationary portion 128 of the shaping rail 126. The larger radius at the junction 260 minimizes, if not eliminates bunching of the L-shaped bar 252 at the junction 248 when the straight bar is bent to the shape of the L-shaped bar 248.

As mentioned above, the support frame 242 is pivotally mounted on the upright members 244 and 245 of the U-shaped member 246. With continued reference to FIGS. 3 and 4, the U-shaped frame 246 includes the upright members 244 and 245 interconnected by center member 264. The center member 264 overlays and is secured to the main support member 124 in any convenient manner, e.g. the central member 264 was connected to the main support member 124 by welding. The center member had a length such that the shaping rail 126 was between the upright members 244 and 245 as shown in FIGS. 3 and 4.

The articulating rail portion 130 of the shaping rail 126 is pivotally mounted to the main support frame 124 in any convenient manner. With reference to FIG. 3, the support frame 242 of the articulating portion 130 had a generally L-shaped configuration with a long leg 270 and a short leg 272. The long leg 270 of the L-shaped support frame 242 was pivotally mounted to the upright member 244 through an arrangement that included an angle iron 274 having leg members 276 and 278, with the leg member 276 pivotally mounted to the upright member 244 in a manner discussed below. End portion 280 of the long leg 270 of the support frame 242 was curved generally corresponding to the curved end portion of the long leg 250 of the steel bar 248. The end portion 280 of the long leg 270 of the support frame 242 is welded to the leg member 278 of the angle iron 274. A gusset plate 284 had end 286 welded to the long leg 270 of the support frame 242 and opposite end 288 of the gusset plate 284 welded to the end portion 280 of the long leg 270 of the support frame 242 as shown in FIG. 3. Further, as shown in FIG. 3, the upright member 244 included a grooved end 300 to receive the end portion 280 of the leg member 276 of the angle iron 274. A bolt 302 of a nut and bolt assembly 304 passes through walls 306 of the grooved end 300 of the upright member 244 and through the end portion 280 of the leg member 276 to pivotally mount the angle iron 274 to the upright member 244.

Figure 10:
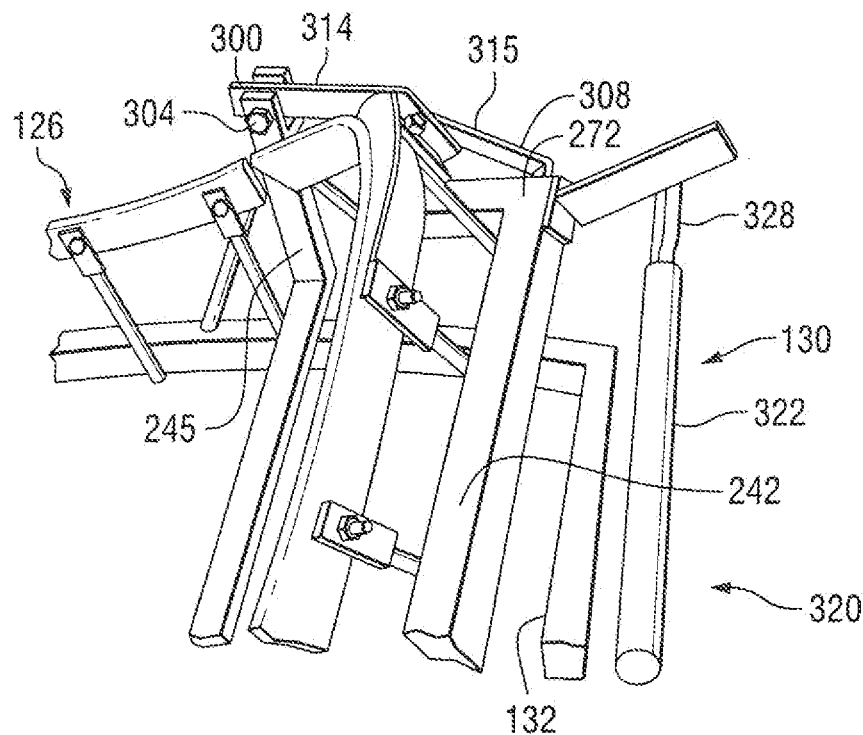
FIGS. 10 and 11 are enlarged isometric views of a pivot position of an end portion of a non-limiting embodiment of an articulating shaping rail portion of the bending device of the invention shown in FIGS. 3 and 4.
Figure 11:
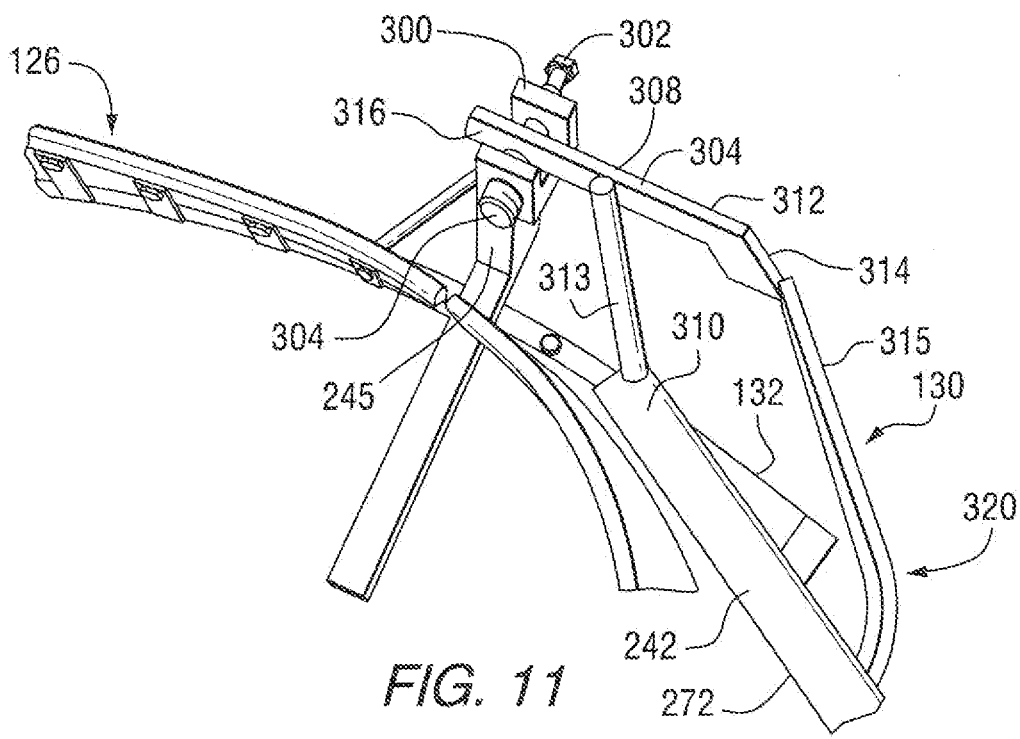

The discussion is now directed to pivotally mounting the articulating rail portion 130 of the shaping rail 126 to the upright 245. With reference to FIGS. 4, 10 and 11 as needed, the short leg 272 of the support frame 242 of the articulating rail portion 130 of the shaping rail 126 is secured to angle iron 308 in any convenient manner. For example and not limiting to the invention, end portion 310 of the short leg 272 of the support frame 242 of the articulating rail portion 130 was welded to leg member 312 of the angle iron 308 by way of metal rod 313 (see FIG. 11). Other leg member 314 of the angle iron 308 is also welded to the short leg 272 of the support frame 242 of the articulating portion 130 by way of a gusset plate 315 as shown in FIG. 11. End portion 316 of the leg member 312 is pivotally mounted to the upright member 245 by the nut and bolt assembly 304 in a similar manner as the leg member 276 of the angle iron 274 is pivotally mounted to the upright member 244 as shown in FIG. 3.

With the leg members 276 and 314 of the angle irons 274 and 308, respectively, pivotally mounted to their respective upright member 244 and 245 of the U-shaped frame 246, moving the support member 242 of the articulating rail portion 130 of the shaping rail 126 in a clockwise direction as viewed in FIG. 3, or in a counterclockwise direction as viewed in FIG. 4, lowers the articulating rail portion 130 of the shaping rail 126 to the sheet receiving position to receive the flat sheet 148 (see FIG. 5). Moving the support member 242 of the articulating rail portion 130 of the shaping rail 126 in the counterclockwise direction as viewed in FIG. 3, or in a clockwise direction as viewed in FIG. 4, raises the articulating rail portion 130 of the shaping rail 126 to the shaping position to shape the flat glass sheet 148 (see FIG. 5) to the shaped glass sheet 120 shown in FIG. 2.

The invention is not limited to the biasing facilities used in the practice of the invention to move the articulating rail portion 130 of the shaping rail 126 from the non-shaping position to the shaping position. With reference to FIGS. 3, 4, 10 and 11 as need, there is shown a biasing arrangement 320 that has been used in the practice of the invention to move the articulating portion 130 from the non-shaping position to the shaping position. It is to be noted that portions of the biasing facilities are missing from FIG. 4 for purposes of clarity.

The biasing arrangement 320 (FIG. 3) includes an elongated rod 322 pivotally mounted at a position 324 between ends 326 and 328 of the rod 322 in any convenient manner to an upright 330. In one embodiment of the invention, end 332 of the upright 330 is welded to a plate 334, which is welded to the frame 132 of the bending device 122. Opposite end 336 of the upright 330 has a groove 338 to receive the rod 322. Walls 340 of the groove 338 and the rod 322 at the position 324 have holes 342 to receive nut and bolt arrangement 344, which includes a bolt 346 in the holes 342 of the walls 340 of the groove 338 and the hole in the position 324 of the rod 322 and secured in position by nuts 348. With this arrangement, the rod 322 is pivotally mount to the upright 330 at position 324 such that moving the end 326 of the rod 322 in a first direction, e.g. in the direction of arrow 350 moves the opposite end 328 of the rod 322 in a second opposite direction, e.g. in the direction of the arrow 352 (see FIG. 3), or such that moving the end 326 of the rod 322 in a third direction, e.g. in the direction of arrow 354 moves the opposite end 328 of the rod 322 in a fourth opposite direction, e.g. in the direction of the arrow 356 (see FIG. 3).

A force biasing member or weight 360 is mounted adjacent one of the ends of the elongated rod 322, e.g. the end 326 (see FIG. 3) to continuously bias the end 326 of the rod 322 in the direction of the arrow 350 to place the articulating rail portion 130 in the shaping position, and to move the opposite end, e.g. the end 328 of the rod 332 in the direction of the arrow 352. The invention is not limited to the mounting of the force biasing member 360 on any particular end of the rod 322. In one non-limiting embodiment of the invention, if the articulating rail portion 130 of the shaping rail 126 is heavier at one end, the force biasing member 360 is mounted on the end of the rod adjacent the lighter end of the articulating rail portion 130 to reduce the weight or force that has to be applied to the articulating rail portion 130 to raise the articulating rail portion 130. More particularly, and with reference to FIG. 3, the articulating rail portion 130 of the shaping rail 126 has an L-shape support 240. In this instance, the force biasing member 360 is preferably mounted on the end 326 of the rod 322, and the end 328 of the rod 322 is arranged to engage the articulating rail portion 130 at a position adjacent the short leg 242 of the L-shape support 240 of the articulating rail portion 130 in a manner discussed below. To raise the articulating rail portion 130 in the direction of the arrow 352 to move the articulating rail portion 130 to the shaping position.

In the non-limiting embodiment of the invention under discussion, the L-shaped support 240 adjacent the junction of the long leg 270 and the short leg 272 designated by the number 362 has a metal bar 364 having end 366 welded to the position 362 of the L-shaped support frame 240. The end 328 of the elongated rod 332 passes under the bar 364 such that moving the end 326 of the rod 322 in the direction of the arrow 350 moves the articulating rail portion 130 in the direction of the arrow 352 to move the articulating rail portion 130 to the shaping position and moving the end 326 of the rod 322 in the direction of the arrow 354 movies the end 328 in the direction of the arrow 356 to move the articulating portion 130 to the sheet receiving position or non-shaping position.

The applied force of the force biasing member 360 is selected to apply sufficient biasing force to raise the articulating rail portion 130 of the shaping rail 126 (see FIGS. 3 and 4) with the sheet 148 (see FIG. 5) supported on the shaping rail 126 and heated to its shaping temperature, and the biasing force should be insufficient to raise the articulating rail portion 130 with the sheet 148 is supported on the shaping rail 126. In one non-limiting embodiment of the invention, a glass, e.g. a soda-lime-silica glass, and a lithium glass having a thickness of 6 millimeters and heated to their bending temperate were shaped using a force biasing member 360 weighing 3 pounds. In another non-limiting embodiment of the invention, a glass, e.g. a soda-lime-silica glass, and a lithium glass, having a thickness of 14 millimeters, heated to their bending temperature were shaped using a force biasing member 360 weighing 5 pounds.

In the practice of the invention, a flat glass sheet 148 is placed on the shaping rail 126 of the bending iron 122. Two ends, e.g. the ends 150 and 152 (see FIG. 5) of the sheet 148 are moved against the three sheet retention and alignment members 214 to align the sheet 148 on the shaping rail 126 of the bending iron 122. The weight of the sheet 148 moves the articulating rail portion 130 of the shaping rail 126 and the end 328 of the rod 322 in the direction of the arrow 356 and moves the end 326 of the rod 322 and the force biasing member 360 in the direction of the arrow 354. When the sheet 148 is heated to a temperature within its shaping temperature range, the biasing force of the force applying member 360 moves the end 326 of the rod 332 in the direction of the arrow 350 to move the end 328 of the rod 322 in the direction of the arrow 352 to raise the articulating portion 130 of the bending iron 122 (see FIGS. 3 and 4) to shape the sheet 148.

As the articulating rail portion 130 moves in the direction of the arrow 352, the end 150 of the sheet 148 is prevented from moving off of the shaping rail 126 by the sheet retention and alignment members 214 opposite to the articulating rail portion 130 (see FIGS. 3 and 4). Movement of the articulating rail portion 130 also moves the end 154 of the sheet against the sheet retention and alignment member 214. As can now be appreciate, the sheet retention and alignment members 214 maintain the sheet 148 in position on the shaping rail 126 during the shaping of the sheet 148 (see FIG. 5) to the sheet 120 (see FIG. 2).

It was noted that during the shaping of the glass sheet 148 that the glass sheet 148 would occasionally stick in the area of the articulating rail portion 130 adjacent the juncture of the long leg 259 and the short leg 256 of the L-shaped shaping rail of the articulating rail portion 130. It is believed the sticking was due to the sheet slightly bending over the shaping rail of the articulating rail portion 130 as the articulating rail portion 130 was raised to shape the sheet 148. To prevent the sheet 148 or 120 from being marred by the movement of the articulating rail portion 130, a member 367 having a non-friction or reduced friction sliding surface 368 is provide at the curved corner of the shaping rail 240 of the articulating rail portion 130 as shown in FIGS. 3 and 4. Reducing or eliminating the sticking of the sheet during the raising of the articulating rail portion 130 reduces marring of the sheet surface, which can cause optical distortion of the glass. In one non-limiting embodiment of the invention, the member 367 was made of metal, e.g. but not limited to stainless steel.

With continued reference to FIG. 4, the movement of the articulating rail portion 130 during the shaping of the glass sheet 148 to obtain the desired curvature is limited by a stop plate 370 secured on the main support member 124 in the path of the end 326 of the rod 322. A cotter pin 372 is mounted on the end 326 of the rod 322 to prevent the force biasing member 360 from sliding off the rod 322.

As can now be appreciated, the invention is not limited to the embodiment discussed and variations in the embodiment can be while maintaining the features of the invention. For example and not limiting to the discussion the parts of the main support frame were joined together by welding, however, the invention is not limited thereto and the components of the bending iron can be secured by any type of fasteners, e.g. but not limited to nut and bolt arrangements and screws made of a material, e.g. steel that can withstand the elevated temperatures of the glass shaping process while maintaining the structural stability of the bending iron. Further, the end 328 of the rod 322 is shown in FIGS. 3, 4 and 10 as having decreasing diameter so that the contact area between the plate metal bar 364 and the end 328 of the rod 322 is minimized to reduce contact friction as the end 328 of the rod 322 moves along the edge of the metal bar 364, while maintaining the structural stability of the end 328 of the rod 322, e.g. but not limited to being thick enough to prevent bending of the end 328 of the rod 322. In one non-limiting embodiment of the invention, the rod 322 at the end 326 had a diameter of ¾ inch and at the end 328 had a diameter of ⅜.

The invention is not limited to the manner in which the end 328 of the rod 322 of the biasing arrangement 320 (see FIGS. 3 and 4) is connected to the articulating rail portion 130 of the shaping rail 126. More particularly, and with reference to FIG. 12, there is shown another non-limiting embodiment of a biasing arrangement designated by the number 400 for moving the articulating portion 130 to the shaping position. The biasing arrangement 400 includes a rod 402 having a uniform diameter from end 404 to end 406 of the rod 402. The force biasing member 360 is mounted on the rod 402 between the pivot point 324 and the end 404, and adjacent the end 404 of the rod 402. The rod 402 at is pivotally mounted at the position 324 to the upright member 330 in a similar manner as the rod 322 was mounted to the upright member 330 (see FIG. 3). The end 406 of the rod 402 is connected to end 408 of extension rod 410 by two universal joints 412 and 414, and opposite end 416 of the extension rod 410 is welded to the juncture 362 of the long leg 270 and the short leg 272 of the support frame 242 of the articulating rail portion 130 of the shaping rail 126 (see FIGS. 3 and 4).

Figure 12:
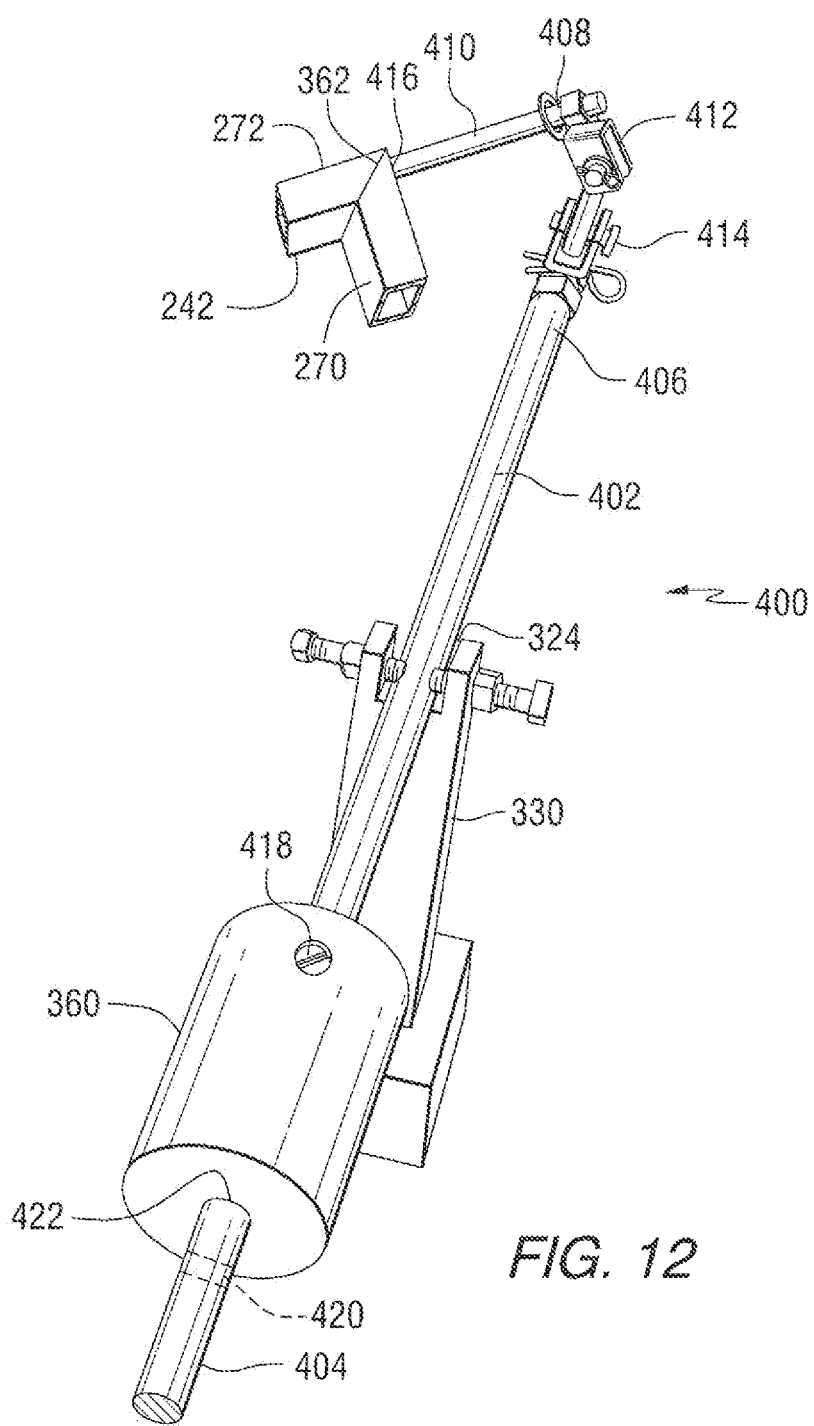
FIG. 12 is an isometric view of a non-limiting embodiment of a biasing arrangement of the invention to move the articulating shaping rail portion of the invention to shape a glass sheet.

The force biasing member 360 can be secured in position on the end of the rod 402 (FIG. 12) or the rod 322 (FIGS. 3 and 4) in any convenient manner, e.g. by a pressure fit, providing a screw 418 to pass through the force biasing member 360 to engage the rod, e.g. the rod 402 as shown in FIG. 12 and/or providing external threads 420 (only shown in phantom in FIG. 12) on the rod 402, and internal threads (not shown) in the passageway 422 of the weight 360.

Figure 13:
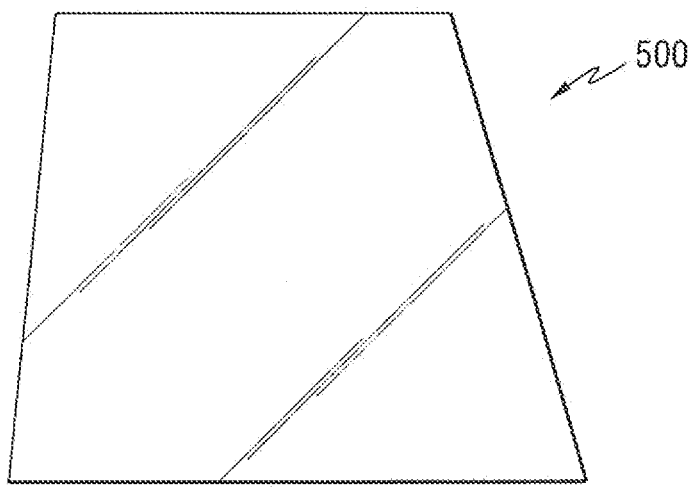
FIG. 13 is an elevated plan view of a flat sheet that can be shape in accordance to the teachings of the invention.
Figure 14:
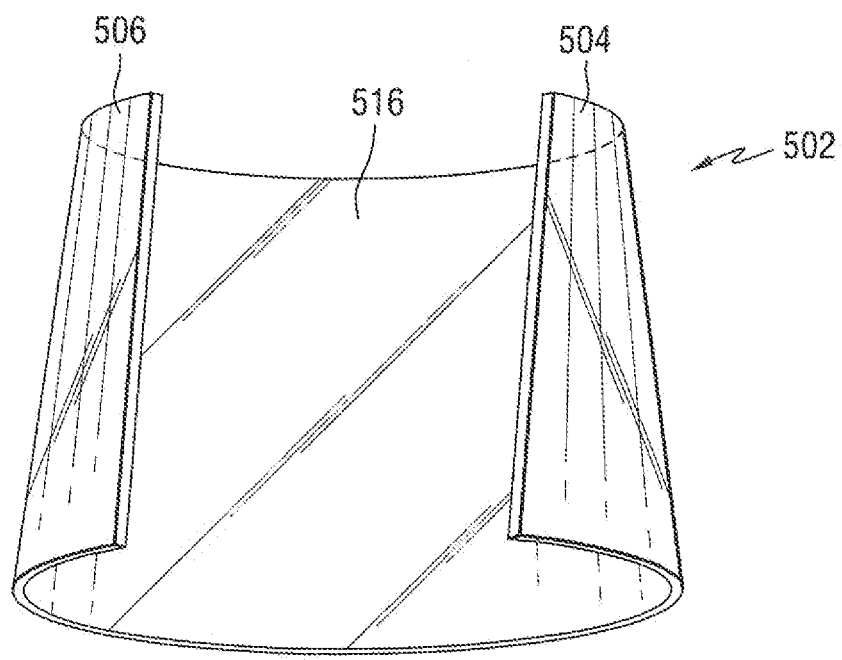
FIG. 14 is an elevated plan view of a shaped sheet that is shaped in accordance to the teachings of the invention.
Figure 15:
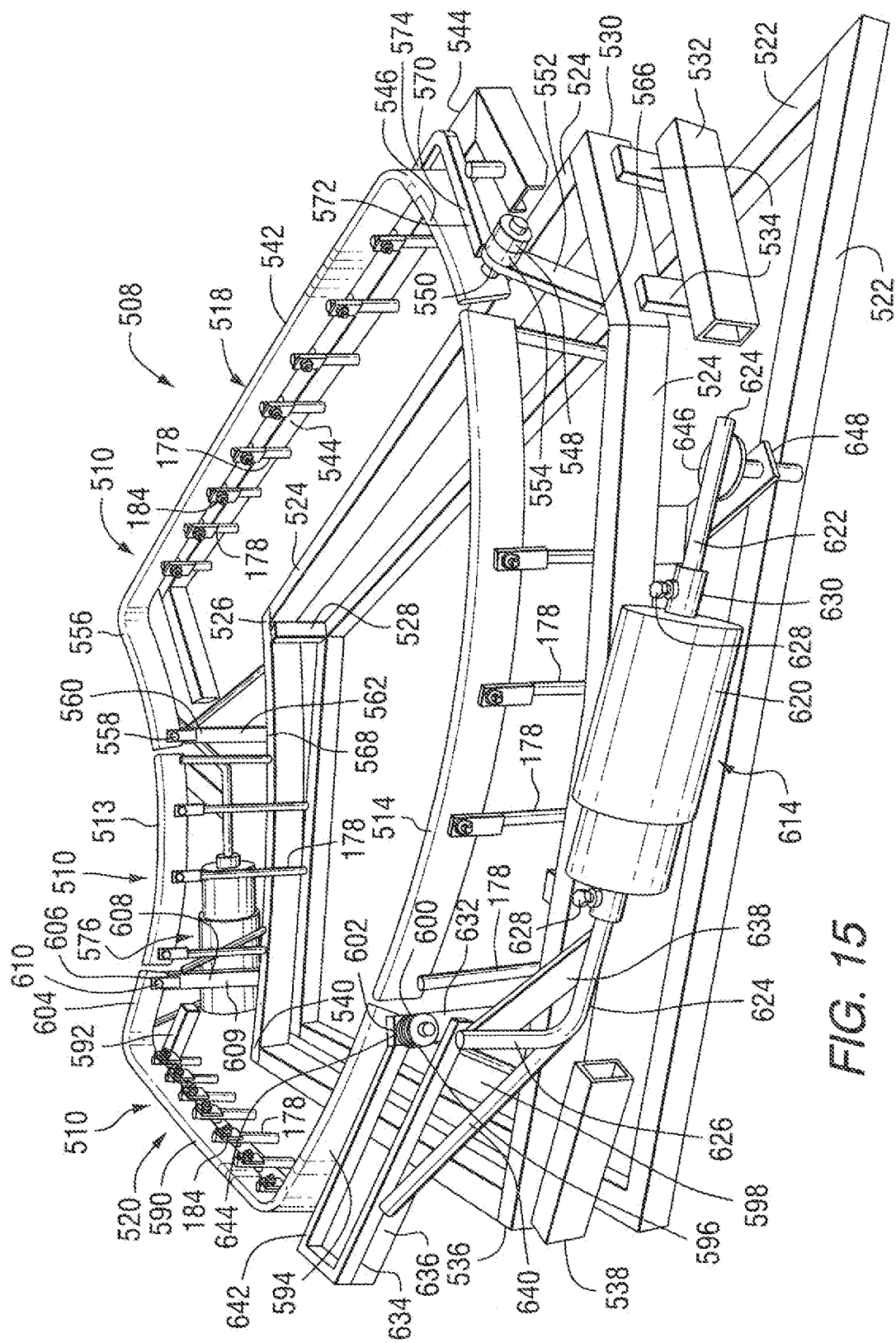
FIG. 15 is an isometric view of a non-limiting embodiment of bending device of the invention that can be used in the practice of the invention to, among other things, shape glass sheets of the type shown in FIG. 14.

The discussion will now be directed to a bending iron having a shaping rail having two articulating portions to provide a shaped glass sheet having an asymmetric shape, e.g. two different shaped curved sections. More particularly and not limiting to the invention, a bending iron to shape a flat glass sheet 500 (see FIG. 13) to a shaped glass sheet 502 (see FIG. 14) having curved end portions 504 and 506. A non-limiting embodiment of a bending iron that can be used in the practice of the invention to shape the flat sheet 500 to the shaped sheet 502 is shown in FIG. 15 and designated by the number 508. The bending iron 508 has a shaping rail 510 having a first stationary shaping rail portion 512 and a second stationary shaping rail 514 to shape center portion 516, i.e. the portion 516 of the sheet between the curved segments 504 and 506, a first articulating shaping rail portion 518 to shape the curved segment 504 and a second articulating shaping rail portion 520 to shape the curved segment 506. The shaped sheet 502 can be used for a monolithic or in a laminated window of an aircraft.

The bending iron 508 includes a main support member 522 and a shaping rail support member 524. The shaping rail support member 524 is secured on the main support member 522 by welding. As shown in FIG. 15, the shaping rail support member 524 is space at different distances from the main support member 522 to provide a tilt to the shaping rail support member 524 such that gravity aids in keeping the sheets 500 and 502 on the shaping rail 510 during the shaping of the sheet 500. The invention is not limited to the manner in which the shaping rail support member 524 is spaced and secured to the main support member 522. In one non limiting embodiment of the invention, corner 526 of the shaping rail support member 524 is secured to the main support member 522 by a vertical shim 528 welded to the shaping rail support member 524 and the main support member 522; at corner 530 of the shaping rail support member 524, the shaping rail support member 524 is secured to the main support member 522 by welding a section of steel tubing 532 and plates 534 to the shaping rail support member 524 and the main support member 522 as shown in FIG. 15; the corner 536 of the shaping rail support member 524 is secure to the main support member 522 by welding a section of steel tubing 538 to the shaping rail support member 524 and the main support member 522 as shown in FIG. 15, and the corner 540 of the shaping rail support member is welded directly to the main support member 522 as shown in FIG. 15.

The first stationary shaping rail portion 512 and the second stationary shaping rail portion 514 are fabricated in a similar manner as the stationary shaping portion 128 of the shaping rail 126 (see FIGS. 3 and 4) except that no bending was required for corners (see FIG. 8). The first stationary shaping rail portion 512 and the second stationary shaping rail portion 514 are secured to the shaping rail support member 524 by the ridged support member 178, and the nut and bolt assembly 184 in a similar manner as the stationary portion 128 of shaping rail 126 was secured to the frame 132 (see FIGS. 3 and 4).

With reference to FIG. 15, the discussion is now directed to the first articulating shaping rail portion 518. The first articulating shaping rail portion 518 includes a shaping rail 542 having a generally U-shape and is connected to a stabilizing bar 544 by the ridged support member 178, and the nut and bolt assembly 184 in a similar manner as the stationary portion 128 of shaping rail 126 was secured to the frame 132 (see FIGS. 3 and 4). Leg 546 of the first articulating shaping rail portion 518 is pivotally mounted at pivot point 548 to end 550 of an upright 552 by a bolt and nut arrangement 564. Leg 556 of the first articulating shaping rail portion 518 is pivotally mounted at pivot point 558 to end 560 of an upright 562 by a nut and bolt arrangement 564. End 566 of the upright 552 and end 568 of the upright 562 are each welded to the shaping rail support member 524. A strengthening bar 570 has one end 572 connected to the pivot point 558 and end portion 574 welded to the stabilizer bar 570.

A biasing device 576 discussed in more detail below is connected in a manner discussed below to move the first articulating shaping rail portion 518 in a counterclockwise direction as viewed in FIG. 15 to move the first articulating shaping rail portion 518 from the non-shaping position to the shaping position.

With continued reference to FIG. 15, the discussion is now directed to the second articulating shaping rail portion 520. The second articulating shaping rail portion 520 includes a shaping rail 590 having a generally U-shape configuration and is connected to a stabilizing bar 592 by the ridged support members 178, and the nut and bolt assembly 184 in a similar manner as the stationary portion 128 of shaping rail 126 was secured to the frame 132 (see FIGS. 3 and 4). Leg 594 of the second articulating shaping rail portion 520 is pivotally mounted at pivot point 596 to end 598 of an upright 600 by a bolt and nut arrangement 602. Leg 604 of the second articulating shaping rail portion 520 is pivotally mounted at pivot point 606 to end 608 of an upright 609 by a bolt and nut arrangement 610. The pivot arrangement at pivot point 606 for the upright 609 of the second articulating shaping rail portion 520 is similar to the pivot arrangement for the pivot point 548 for the upright 552 of the first articulating shaping rail portion 518 as shown in FIG. 15.

A biasing device 614 discussed in more detail below is connected in a manner discussed below to move the second articulating shaping rail portion 520 in a clockwise direction as viewed in FIG. 15 to move the second articulating shaping rail portion 520 from the non-shaping position to the shaping position.

The biasing device 614 shown in FIG. 15 includes a force biasing member 620 mounted on a ridged L-shaped rod 622 having a long leg 624 and a short leg 626. The force biasing member 620 is mounted on the long leg 624 and secured in position by screws 628 passing through a collars 630 mounted on the long leg 624 on each side of the force biasing member 620 and engaging the long leg 624 of the rod 622. The short leg 626 of the rod 622 is connected at end 632 to a first outer leg 634 of a U-shaped member 636. A metal gusset plate 638 has one end welded to the short leg 626 and an opposite end welded to the long leg 624 of the L-shaped rod 622. A metal rod 640 has one end welded to the first outer leg 634 of the U-shaped member 636 and the opposite end welded to the L-shaped member, e.g. but not limiting to the invention, the juncture of the short leg 626 and the long leg 624 of the L-shaped rod 622. Second outer leg 642 of the U-shaped member 636 has its end 644 connected to the pivot point 596 and is welded to outer surface of the leg 594 of second articulating shaping rail portion 520.

With the above discussed arrangement of the biasing device 614, the biasing force of the force biasing member 620 moves the second articulating shaping rail portion 520 in a clockwise direction as viewed in FIG. 15 to move the second articulating shaping portion 520 to the shaping position. The downward motion of the force biasing member 620 is limited by a stop plate 646 mounted on a metal support member 648. The metal support member 648 has one end welded to the shaping rod support member 524 and the opposite end welded to the main support member 522.

With reference to FIGS. 15 and 16 as needed, the connection of the biasing device 576 to the first articulating shaping rail portion 518 is similar in construction to the connection of the biasing device 614 to the second articulating shaping rail portion 520 presented above except that the stop 646 is mounted on a metal strip 650 connected to the corner 540 of the shaping rail support member 524. With this arrangement the biasing force of the weight 620 of the biasing device 576 moves the first articulating shaping rail portion 518 in a counterclockwise direction as viewed in FIG. 15 to move the first articulating shaping portion 518 to the shaping position. The stop plate 646 limits the downward motion of the force biasing member 620 of the biasing device 576.

Other variations as are known to those skilled in the art can be resorted to without departing from the scope of the invention as defined by the claims that follow.

What is claimed is:

1. A sheet bending device comprising:
a support member;
a sheet shaping rail comprising a stationary shaping rail portion securely mounted on the support member and an articulating shaping rail portion pivotally mounted on the support member, wherein the stationary shaping rail portion has a first leg, a second leg and a middle leg, the legs connected to one another to provide the stationary shaping rail portion with a generally U-shaped configuration, and the articulating shaping rail shaping portion is pivotally mounted on the support member with one end of the articulating shaping rail portion adjacent an end of the first leg of the stationary shaping rail portion and an opposite end of the articulating shaping rail portion adjacent an end of the second leg of the stationary shaping rail portion, wherein moving the articulating shaping rail portion from a non-shaping position to a shaping position moves the articulating shaping rail portion toward the middle leg of the stationary shaping rail portion;
a force biasing member operatively connected to the articulating shaping rail portion to move the articulating shaping rail portion from the non-shaping position to the shaping position, and
a retention member to limit movement of a sheet to be shaped relative to the stationary shaping rail portion wherein the retention member comprises at least one stop member having a cone shaped segment and a cylindrical shaped segment, wherein the cone shaped segment engages a peripheral edge of the sheet to be shaped when the sheet to be shaped is positioned on the stationary shaping member, and the cylindrical shaped segment of the retaining member engages the peripheral edge of the sheet to be shaped to limit movement of the sheet to be shaped over the stationary shaping rail portion toward the middle leg of the stationary shaping rail portion as the articulating shaping rail portion moves from the non-shaping position to the shaping position.

2. The sheet bending device according to claim 1, wherein the retention member is a first retention member and the bending device comprises a second retention member, wherein the first and the second retention members are mounted on the middle leg of the stationary shaping rail portion of the sheet shaping rail with the first and the second retention members spaced from one another, wherein the second retention member comprises a second stop member having a cone shaped segment and a cylindrical shaped segment, wherein the cone shaped segment of the second retention member engages the peripheral edge of the sheet to be shaped when the sheet to be shaped is positioned on the stationary shaping member, and the cylindrical shaped segment of the second retaining member engages the peripheral edge of the sheet to be shaped to limit movement of the sheet to be shaped over the stationary shaping rail portion toward the middle leg of the stationary shaping rail portion as the articulating shaping rail portion moves from the non-shaping position to the shaping position.

3. The sheet bending device according to claim 2, wherein the articulating shaping rail portion comprises an L-shaped shaping rail securely mounted on a support frame and a pair of spaced uprights mounted on the support member, wherein one upright is mounted on the support member adjacent the end of the first leg of the stationary shaping rail and the second upright is mounted on the support member adjacent the end of the second leg of the stationary shaping rail, wherein one end of the support frame is pivotally mounted to one of the uprights and other end of the support frame is pivotally mounted to the second upright.

4. The sheet bending device of claim 3, wherein a metal plate is mounted to the articulating shaping rail portion adjacent to the juncture of a long leg and a short leg of the L-shaped shaping rail for ease of moving the sheet to be shaped over the L-shaped shaping rail when the articulating shaping rail portion is moved by the force biasing member from the non-shaping position to the shaping position.

5. The sheet bending device according to claim 2, wherein a corner of the sheet shaping rail between the first leg and the middle leg of the stationary shaping rail has a first cut out and a first continuous portion, and a corner of the sheet shaping rail between the second leg and the middle leg of the stationary shaping rail portion has a second cut out and a second continuous portion, wherein openings of the first and the second cut outs face in a direction away from the support member, and each of the first and second cut outs have an insert.

6. The sheet bending device according to claim 5, wherein the sheet shaping rail is spaced from the support member, the first continuous portion is between the first cut out and the support member, and the second continuous portion is between the second cut out and the support member, and each insert is made of metal.

7. The sheet bending device according to claim 1, wherein the stationary shaping rail portion has a first end spaced from a second end and the articulating shaping rail portion comprises an L-shaped shaping rail securely mounted on a support frame and a pair of spaced uprights mounted on the support member, wherein one upright is mounted on the support member adjacent the first end of the stationary shaping rail portion and the second upright is mounted on the support member adjacent the second end of the stationary shaping rail portion, wherein the support frame is pivotally mounted on the uprights to move toward and/or over the ends of the stationary shaping rail portion when the articulating shaping rail portion moves from the non-shaping position to the shaping position.

8. The sheet bending device of claim 7, wherein a metal plate is mounted to the articulating shaping rail portion adjacent to the juncture of a long leg and a short leg of the L-shaped shaping rail for ease of moving the sheet to be shaped over the L-shaped shaping rail when the articulating shaping rail portion is moved by the force biasing member from the non-shaping position to the shaping position.

9. The sheet bending device according to claim 2, comprising a third retention member mounted on one of the first and second legs of the stationary shaping rail portion.

10. The sheet bending device according to claim 2, wherein the first and second retention members each include a metal core covered with a carbon sheath.

11. The sheet bending device according to claim 1, wherein the force biasing member comprises a rigid rod having a first end and a second end, a pivot point between the first end and the second end of the rigid rod, a weight secured adjacent to the first end of the rigid rod, and the second end of the rigid rod having peripheral dimensions less than the peripheral dimensions of the first end of the rigid rod, wherein the second end of the rigid rod is in sliding engagement with a metal rod secured to the support frame, wherein moving the weight in a first direction moves the second end of the rigid rod in an opposite second direction to move the second end of the rigid rod along a surface of the metal rod to move the articulating shaping rail portion from the non-shaping position to the shaping position, and a stop plate to limit movement of the first end of the rigid rod in the first direction.

12. The sheet bending device according to claim 1, wherein the force biasing member comprises a rigid rod having a first end and a second end, a pivot point between the first end and the second end of the rigid rod, a weight secured adjacent to the first end of the rigid rod, and the second end of the rigid rod connected to the articulating shaping rail, wherein the connection between the second end of the rigid rod and the and the articulating shaping rail includes at least one universal joint, wherein moving the weight in a first direction moves the second end of the rigid rod in an opposite second direction to move the second end of the rigid rod along a surface of the metal rod to move the articulating shaping rail portion from the non-shaping position to the shaping position, and a stop plate to limit movement of the first end of the rod in the first direction.

13. The sheet bending device according to claim 1, wherein a plate is mounted on the support member and in the path of the force biasing member to limit movement of the force biasing member in a predetermined direction.

14. A sheet bending device comprising:
a support member;
a sheet shaping rail comprising a stationary shaping rail portion securely mounted on the support member and an articulating shaping rail portion pivotally mounted on the support member, wherein the stationary shaping rail portion has a first leg, a second leg and a middle leg, the legs connected to one another to provide the stationary shaping rail portion with a generally U-shape configuration, and the articulating shaping rail shaping portion is pivotally mounted on the support member with one end of the articulating shaping rail portion adjacent an end of the first leg of the stationary shaping rail portion and an opposite end of the articulating shaping rail portion adjacent an end of the second leg of the stationary shaping rail portion, wherein moving the articulating shaping rail portion from a non-shaping position to a shaping position moves the articulating shaping rail portion toward the middle leg of the stationary shaping rail portion, wherein the stationary shaping rail portion has a first end spaced from a second end and the articulating shaping rail portion comprises an L-shaped shaping rail securely mounted on a support frame and a pair of spaced uprights mounted on the support member, wherein one upright is mounted on the support member adjacent the first end of the stationary shaping rail portion and the second upright is mounted on the support member adjacent the second end of the stationary shaping rail portion, wherein the support frame is pivotally mounted on the uprights to move toward and/or over the ends of the stationary shaping rail portion when the articulating shaping rail portion moves from the non-shaping position to the shaping position;
a force biasing member operative connected to the articulating shaping rail portion to move the articulating shaping rail portion from the non-shaping position to the shaping position, wherein the force biasing member comprises a rigid rod having a first end and a second end, a pivot point between the first end and the second end, a weight secured adjacent to the first end of the rod, and the second end of the rod having peripheral dimensions less than the peripheral dimensions of the first end of the rod, wherein the second end of the rod is in sliding engagement with a metal rod secured to the support frame, wherein moving the weight in a first direction moves the second end of the rod in an opposite second direction to move the second end of the rod along a surface of the metal rod to move the articulating shaping rail portion from the non-shaping position to the shaping position; and a retention member to limit movement of a sheet to be shaped relative to the stationary shaping rail portion when the force biasing member moves the articulating shaping rail portion from the non-shaping position to the shaping position, wherein the retention member comprises at least one stop member to engage peripheral edge of the sheet to be shaped to limit movement of the sheet to be shaped over the stationary shaping portion toward the middle leg of the stationary shaping rail portion as the articulating shaping rail portion moves from the non-shaping position to the shaping position; and a metal plate mounted to the articulating shaping rail portion adjacent to the juncture of a long leg and a short leg of the L-shaped shaping rail for ease of moving the sheet to be shaped over the L-shaped shaping rail when the articulating shaping rail portion is moved by the force biasing member from the non-shaping position to the shaping position.

15. The sheet bending device according to claim 14, comprising a stop plate to limit movement of the first end of the rod in the first direction.

16. A sheet bending device comprising:

a support member;

a sheet shaping rail comprising a stationary shaping rail portion securely mounted on the support member and an articulating shaping rail portion pivotally mounted on the support member, wherein the stationary shaping rail portion has a first leg, a second leg and a middle leg, the legs connected to one another to provide the stationary shaping rail portion with a generally U-shaped configuration, and the articulating shaping rail shaping portion is pivotally mounted on the support member with one end of the articulating shaping rail portion adjacent an end of first leg of the stationary shaping rail portion and an opposite end of the articulating shaping rail portion adjacent an end of the second leg of the stationary shaping rail portion, wherein moving the articulating shaping rail portion from a non-shaping position to a shaping position moves the articulating shaping rail portion toward the middle leg of the stationary shaping rail portion, wherein the articulating shaping rail portion comprises an L-shaped shaping rail securely mounted on a support frame and a pair of spaced uprights mounted on the support member, wherein one upright is mounted on the support member adjacent the end of the first leg of the stationary shaping rail and the second upright is mounted on the support member adjacent the end of the second leg of the stationary shaping rail, wherein one end of the support frame is pivotally mounted to one of the uprights and other end of the support frame is pivotally mounted to the second upright;

a force biasing member operatively connected to the articulating shaping rail portion to move the articulating shaping rail portion from a non-shaping position to a shaping position, wherein the force biasing member comprises a rigid rod having a first end and a second end, a pivot point between the first end and the second end of the rigid rod, a weight secured adjacent to the first end of the rigid rod, and the second end of the rigid rod having peripheral dimensions less than the peripheral dimensions of the first end of the rigid rod, wherein the second end of the rigid rod is in sliding engagement with a metal rod secured to the support frame, wherein moving the weight in a first direction moves the second end of the rigid rod in an opposite second direction to move the second end of the rigid rod along a surface of the metal rod to move the articulating shaping rail portion from the non-shaping position to the shaping position, and a stop plate to limit movement of the first end of the rigid rod in the first direction, and a retention member to limit movement of a sheet to be shaped relative to the stationary shaping rail portion when the force biasing member moves the articulating shaping rail portion from the non-shaping position to the shaping position, wherein the retention member comprises (1) at least one stop member to engage a peripheral edge of the sheet to be shaped to limit movement of the sheet to be shaped over the stationary shaping rail portion toward the middle leg of the stationary shaping rail portion as the articulating shaping rail portion moves from the non-shaping position to the shaping position, and (2) a cylindrical segment and a cone segment, wherein the cone segment acts to guide the sheet to be shaped onto the sheet shaping rail and the cylindrical portion acts a guide and a retainer to position and maintain the sheet to be shaped at a predetermine position on the sheet shaping rail, wherein the retention member is a first retention member and the sheet bending device comprises a second retention member, wherein the first and the second retention members are mounted on the middle leg of the stationary shaping rail portion of the sheet shaping rail with the first and the second retention members spaced from one another, and a metal plate mounted to the articulating shaping rail portion adjacent to the juncture of a long leg and a short leg of the L-shaped shaping rail for ease of moving the sheet to be shaped over the L-shaped shaping rail when the articulating shaping rail portion is moved by the force biasing member from the non-shaping position to the shaping position.

\* \* \* \* \*

UNITED STATES PATENT AND TRADEMARK OFFICE
CERTIFICATE OF CORRECTION

PATENT NO. : 8,978,420 B2
APPLICATION NO. : 13/714494
DATED : March 17, 2015
INVENTOR(S) : John E. DeAngelis et al.

It is certified that error appears in the above-identified patent and that said Letters Patent is hereby corrected as shown below:

Claims

Claim 12; Column 18, Line 13: delete "and the" at the beginning of the line.

Claim 14; Column 19, Line 15: insert --rail-- between "shaping" and "portion".

Signed and Sealed this
Fifth Day of July, 2016

Michelle K. Lee
*Director of the United States Patent and Trademark Office*